(12) United States Patent
Tso et al.

(10) Patent No.: US 11,780,522 B2
(45) Date of Patent: Oct. 10, 2023

(54) BICYCLE SEAT POST STRUCTURE

(71) Applicant: LIMOTEC METAL INDUSTRY LIMITED, Taichung (TW)

(72) Inventors: Tzu-Chien Tso, Taichung (TW); Yao-Chin Yang, Taichung (TW); Chih-Cheng Cheng, Taichung (TW)

(73) Assignee: LIMOTEC METAL INDUSTRY LIMITED, Taichung (TW)

( * ) Notice: Subject to any disclaimer, the term of this patent is extended or adjusted under 35 U.S.C. 154(b) by 19 days.

(21) Appl. No.: 17/444,194

(22) Filed: Aug. 2, 2021

(65) Prior Publication Data
US 2022/0041237 A1 Feb. 10, 2022

(30) Foreign Application Priority Data

Aug. 6, 2020 (TW) .................................. 109210187
Aug. 19, 2020 (TW) .................................. 109210798

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ......... B62J 1/08; B62J 2001/085; B62J 11/19
See application file for complete search history.

(56) References Cited

U.S. PATENT DOCUMENTS

2012/0104809 A1* 5/2012 Hsu ............................ B62J 1/08
297/215.13

FOREIGN PATENT DOCUMENTS

DE 102016102361 * 9/2016 ................ B62J 1/00
EP 2886430 A1 * 6/2015 ................ B62J 1/08

* cited by examiner

*Primary Examiner* — Milton Nelson, Jr.
(74) *Attorney, Agent, or Firm* — CKC & Partners Co., LLC

(57) ABSTRACT

A bicycle seat post structure includes an upper tube and a lower tube. The lower tube includes an inserted space and a wire passage. The inserted space is configured for the upper tube to be movably disposed therein. The wire passage is located at one side of the inserted space and is configured to receive at least one wire.

7 Claims, 7 Drawing Sheets

BICYCLE SEAT POST STRUCTURE

RELATED APPLICATIONS

This application claims priority to Taiwan Application Serial Number 109210187, filed Aug. 6, 2020 and Taiwan Application Serial Number 109210798, filed Aug. 19, 2020, which are herein incorporated by reference.

BACKGROUND

Technical Field

The present disclosure relates to a seat post structure. More particularly, the present disclosure relates to a bicycle seat post structure.

Description of Related Art

A bicycle includes a seat pose installed on the seat tube of the frame, and the seat post has a height adjusting function for a rider to adjust the height of the saddle. Generally, the seat post can include an upper tube and a lower tube. The upper tube is inserted in the lower tube, and the upper tube is connected to the saddle and can be moved relative to the lower tube.

A conventional seat post can further include a C-shaped clip for securing the upper tube and the lower tube; however, such securing method is easily loosened, and the reliability thereof is not enough. Hence, a height adjusting mechanism is developed to include a tube body for receiving a gas, oil or both of the gas and the oil. A piston and a valve are disposed therein and the height of the piston relative to the tube is changed so as to adjust the height of the seat post. In such configuration, a driving set and a controlling set are included. The driving set can drive the height adjusting mechanism, and the controlling set is configured for the rider to control the driving set. A mechanically-controlled driving set and the controlling set are connected via a steel rope, and the steel rope protrudes from the outer surface of the lower tube. The protruding steel rope results in assembly difficulty between the seat post and the seat tube. In addition, for an electrically-controlled driving set and the controlling set, the driving set is connected to the controlling set via an electric wire; however, since the electric wire protrudes from the outer surface of the lower tube, not only is the assembly difficulty between the seat post and the seat tube increased, but also the electric wire is easily damaged in the assembly process owing to the protruding of the electric wire; as a result, the operation will fail.

Therefore, how to solve the abovementioned problems becomes a pursuit target for practitioners.

SUMMARY

According to one aspect of the present disclosure, a bicycle seat post structure is provided. The bicycle seat post structure includes an upper tube and a lower tube. The lower tube includes an inserted space and a wire passage. The inserted space is configured for the upper tube to be movably disposed therein. The wire passage is located at one side of the inserted space and is configured to receive at least one wire.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
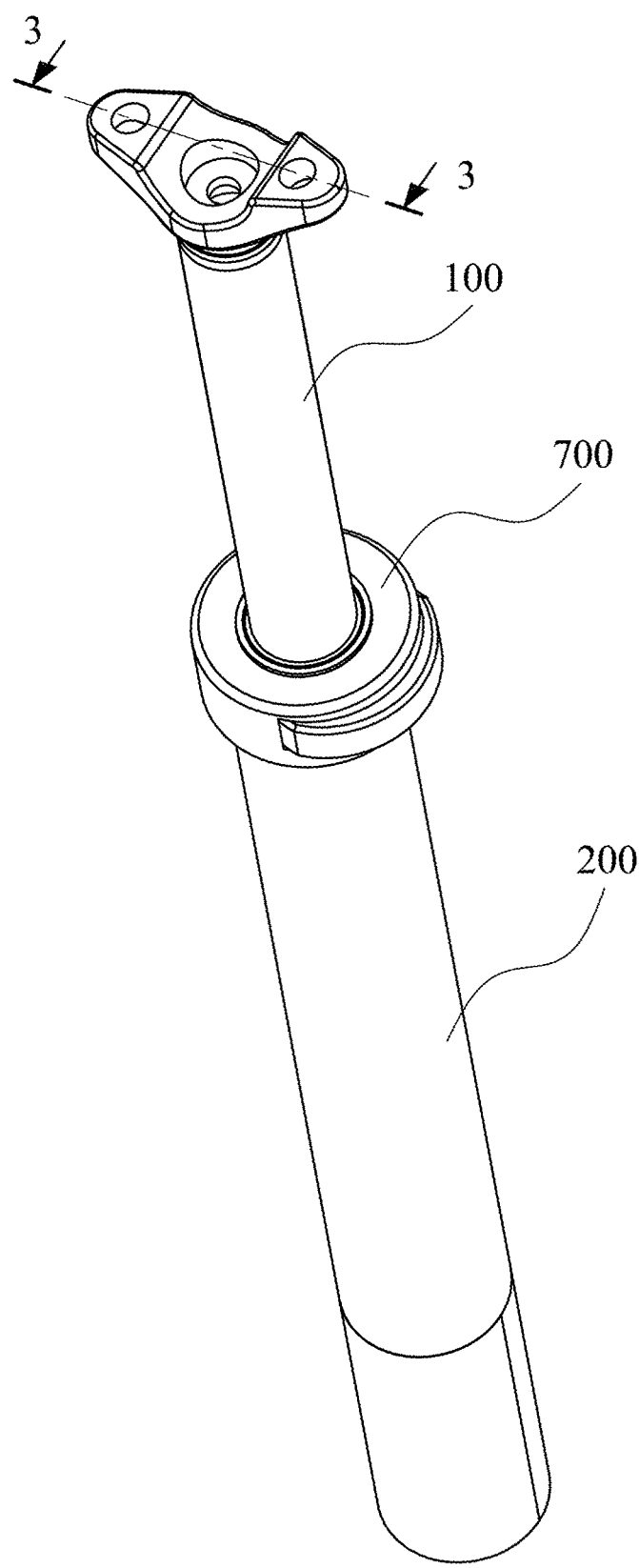
FIG. 1 shows a three-dimensional schematic view of a bicycle seat post structure according to a first embodiment of the present disclosure.
Figure 2:
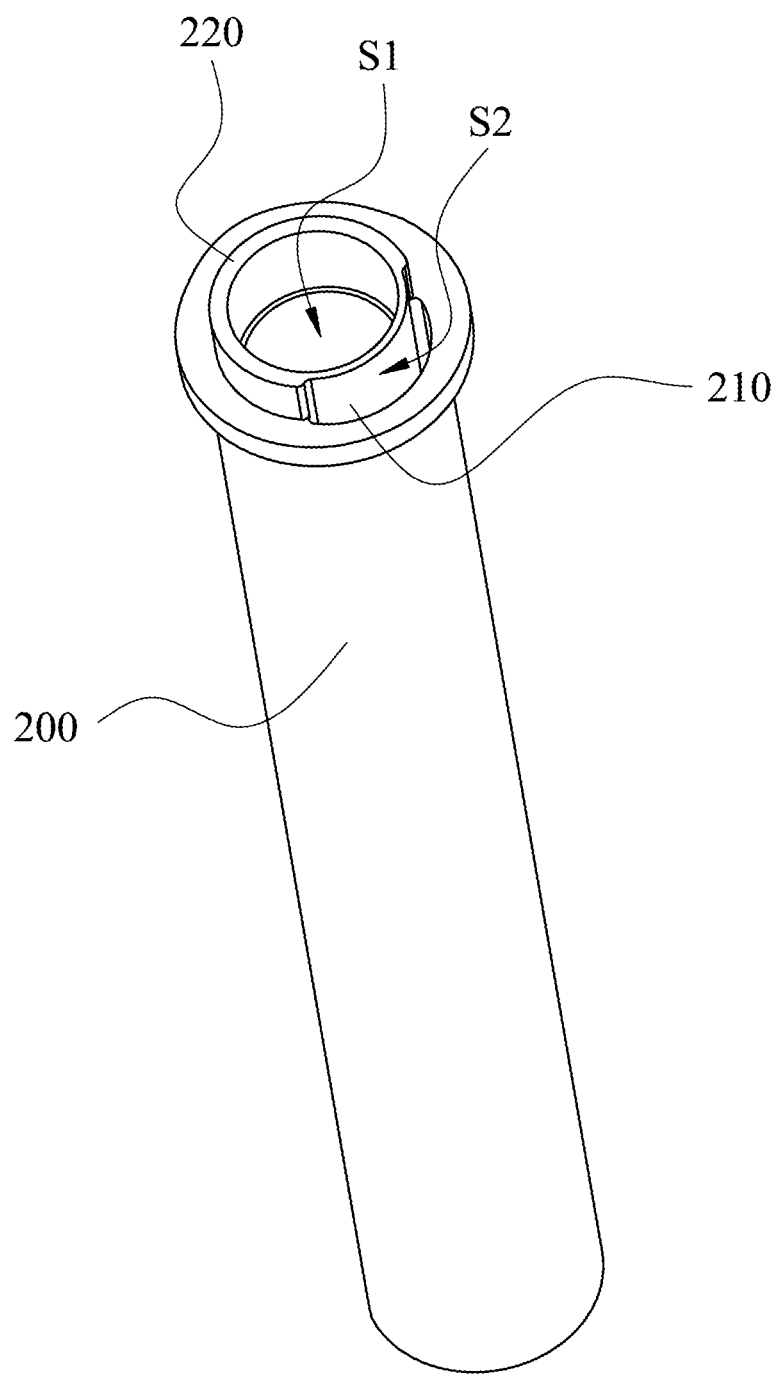
FIG. 2 shows a three-dimensional schematic view of a lower tube of the bicycle seat post structure according to the first embodiment of FIG. 1.
Figure 3:
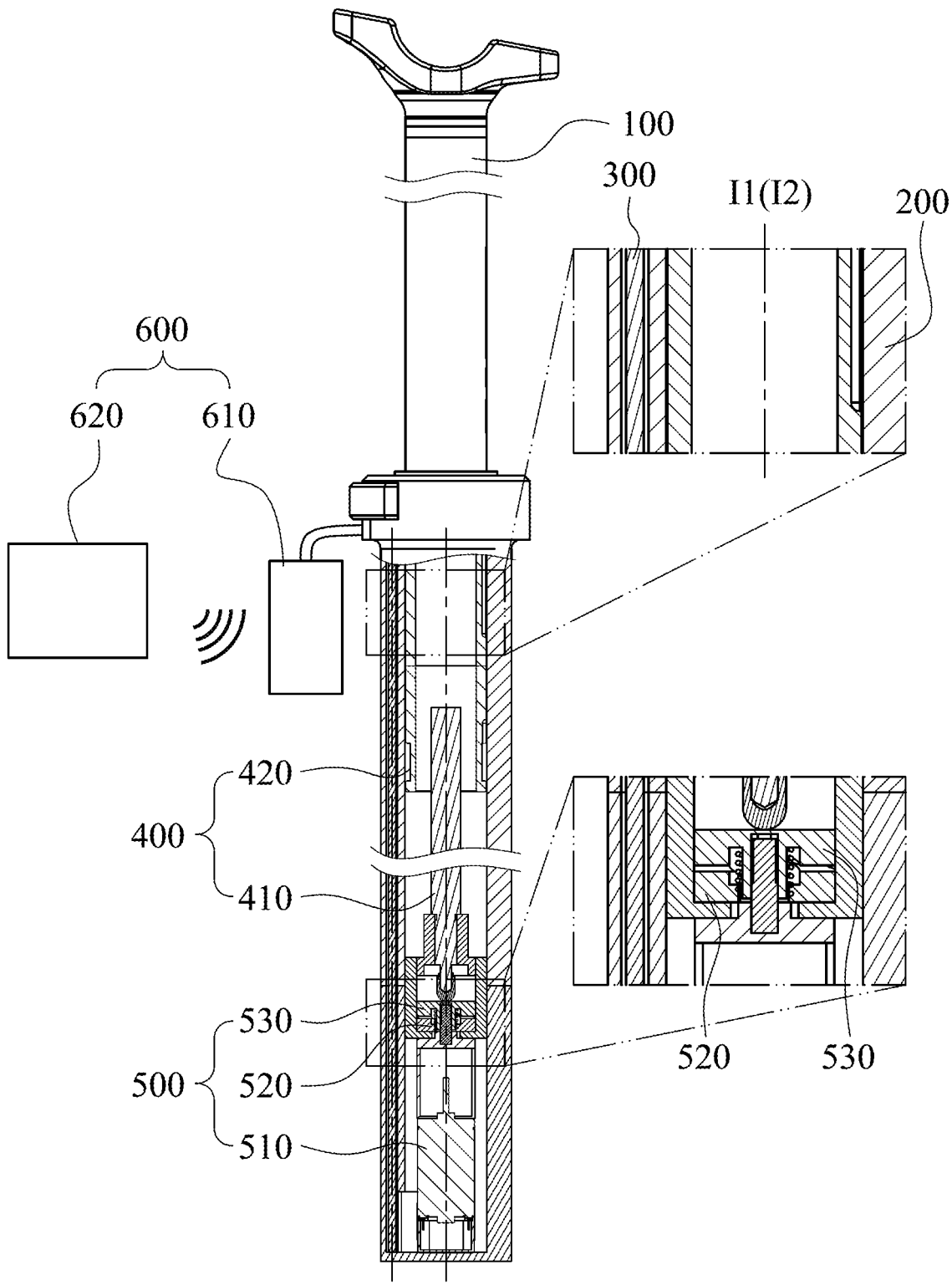
FIG. 3 shows a cross-sectional view of the bicycle seat post structure according to the first embodiment of FIG. 1 taken along line 3-3.

FIG. 1 shows a three-dimensional schematic view of a bicycle seat post structure 10 according to a first embodiment of the present disclosure. FIG. 2 shows a three-dimensional schematic view of a lower tube 200 of the bicycle seat post structure 10 according to the first embodiment of FIG. 1. FIG. 3 shows a cross-sectional view of the bicycle seat post structure 10 according to the first embodiment of FIG. 1 taken along line 3-3, and the controlling set 600 shown in FIG. 3 is omitted in FIG. 1, which will not limit the present disclosure. The bicycle seat post structure 10 includes an upper tube 100 and a lower tube 200. The lower tube 200 includes an inserted space S1 and a wire passage S2. The inserted space S1 is configured for the upper tube 100 to be movably disposed therein. The wire passage S2 is located at one side of the inserted space S1 and is configured to receive at least one wire 300.

Therefore, because the lower tube 200 includes the wire passage S2 configured to receive the wire 300, it can be avoided that the wire 300 protrudes from the outer surface of the lower tube 200. The detail of the bicycle seat post structure 10 will be described hereinafter.

The lower tube 200 can have a circular-tube structure, and the inserted space S1 and the lower tube 200 are concentric. In other words, the lower tube 200 has a first central axis I1, the inserted space S1 has a second central axis I2, and the first central axis I1 and the second central axis I2 are co-axial. The lower tube 200 can further include a partition 210, and the partition 210 extends along a direction of the first central axis I1 to separate the inserted space S1 and the wire passage S2. As shown in FIG. 2, the partition 210 having an arcuate cross-section can separate a circular-shaped inserted space S1 and an arcuate wire passage S2. In addition, the lower tube 200 can further include a convex ring 220 protruding outwardly along the direction of the first central axis I1. The convex ring 220 extends from the partition 210 and can be favorable for a sleeve 700 to nest thereon.

The upper tube 100 also has a circular-tube structure. The upper tube 100 can be inserted into the lower tube 200 from an upper end of the lower tube 200. The upper tube 100 can be movable relative to the lower tube 200 so as to change the height of the upper tube 100 exposed from the lower tube 200.

As shown in FIG. 3, the bicycle seat post structure 10 can further include a height adjusting mechanism 400, a driving set 500 and a controlling set 600. The height adjusting mechanism 400 is disposed inside the upper tube 100 and the lower tube 200 and includes an actuating bar 410. The driving set 500 is configured to push the actuating bar 410. The controlling set 600 is configured to control an operation of the driving set 500 and includes a signal receiving terminal 610 electrically connected to the driving set 500 via the at least one wire 300. The wire 300 can be an electric wire for transmitting the electric signals.

The height adjusting mechanism 400 can further include a tube body 420, a valve (not shown) and a piston (not shown). The actuating bar 410 can insert into the tube body 420, and when the actuating bar 410 is pushed, the valve is opened to allow the movement of the piston, thereby leading the relative movement between the upper tube 100 and the lower tube 200. The abovementioned technique is conventional and is not a key factor of the present disclosure; therefore, the details will not be mentioned and will not be shown in the drawings.

The driving set 500 can include a motor 510, a base 520 and a pushing seat 530. The motor 510 rotates the pushing seat 530. Since both of the pushing seat 530 and the base 520 include corresponding spiral guiding surfaces, the pushing seat 530 can move upwardly relative to the base 520 to push the actuating bar 410 after rotation, thereby allowing the actuating bar 410 to open the valve.

The controlling set 600 can further include a signal emitting terminal 620. A user can operate the signal emitting terminal 620 to transmit the wireless signal to the signal receiving terminal 610, and the signal receiving terminal 610 can control the motor 510 via the wire 300.

Since the wire 300 can be received in the wire passage S2, even the driving set 500 is disposed at a bottom end of the lower tube 200 and the signal receiving terminal 610 is disposed at the upper end of the lower tube 200, the wire 300 can still connect to each other while not protruding from the outer surface of the lower tube 200. The number of the wire 300 is illustrated as one in FIG. 3, but can be modified based on the demands in other embodiment, and the present disclosure is not limited thereto.

Figure 4:
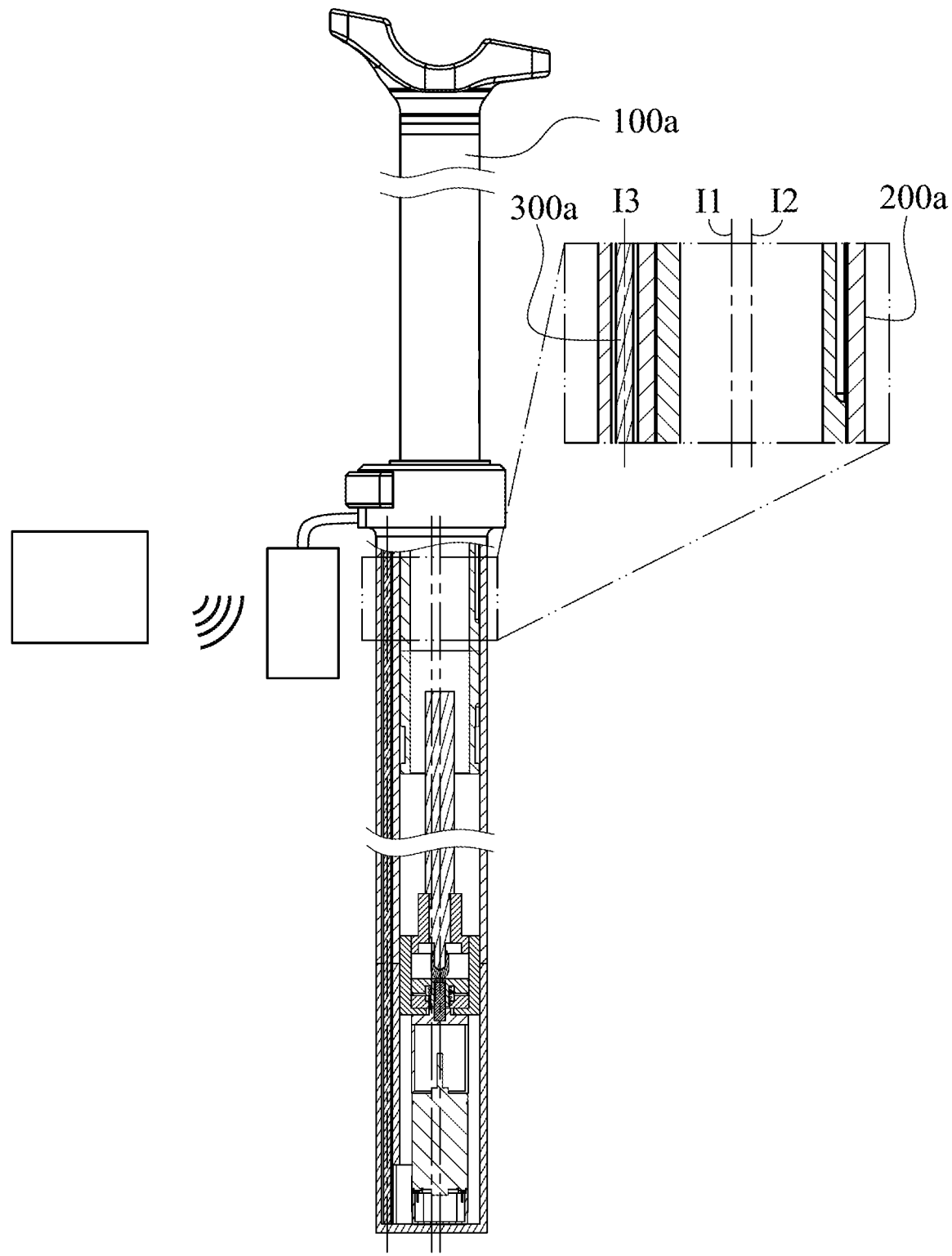
FIG. 4 shows a cross-sectional view of a bicycle seat post structure according to a second embodiment of the present disclosure.
Figure 5:
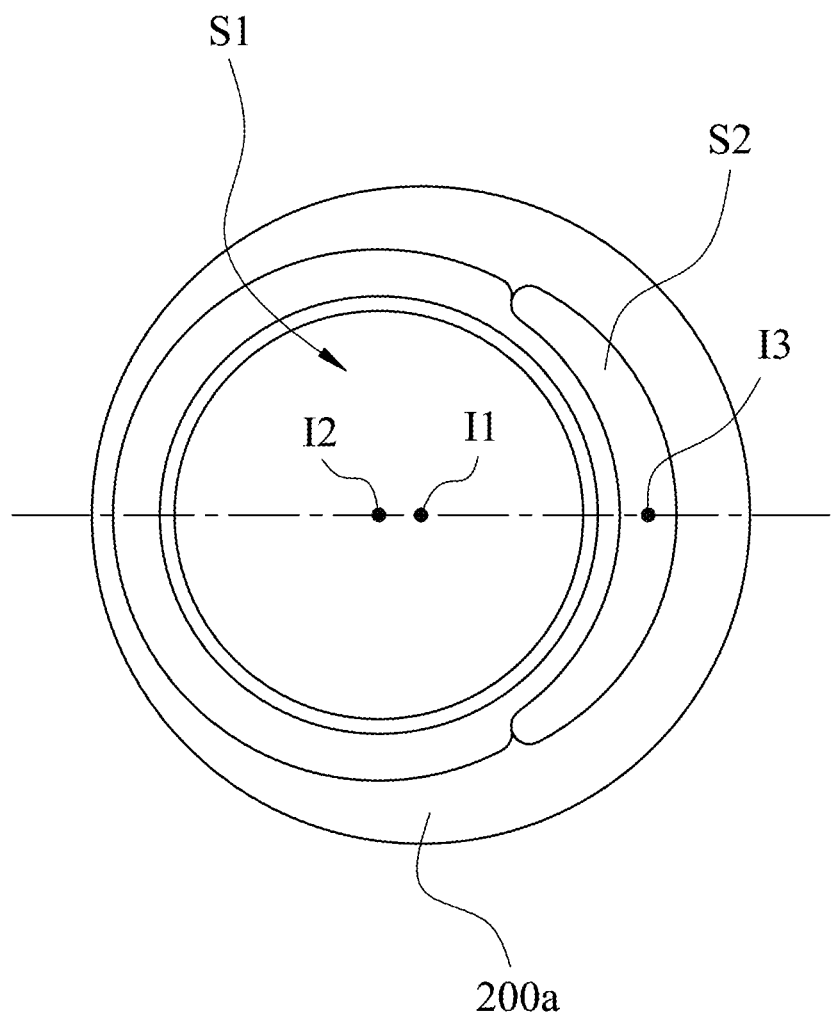
FIG. 5 shows a top view of a lower tube of the bicycle seat post structure according to the second embodiment of FIG. 4.

FIG. 4 shows a cross-sectional view of a bicycle seat post structure 20 according to a second embodiment of the present disclosure. FIG. 5 shows a top view of a lower tube 200a of the bicycle seat post structure 20 according to the second embodiment of FIG. 4. The bicycle seat post structure 20 is similar to the bicycle seat post structure 10 of the first embodiment and includes an upper tube 100a and a lower tube 200a. The lower tube 200a also includes an inserted space S1 and a wire passage S2, and the wire passage S2 is configured to receive the wire 300a. The difference is that the inserted space S1 is eccentric. In other words, the first central axis I1 and the second central axis I2 are not co-axial. Moreover, the wire passage S2 can have a third central axis I3, and the first central axis I1, the second central axis I2 and the third central axis I3 are coplanar but not co-axial. Please be noted that, because FIG. 5 shows the top view of the lower tube 200a, the first central axis I1, the second central axis I2 and the third central axis I3 are all represented by solid dots. As the three solid dots are aligned in a straight line, the first central axis I1, the second central axis I2 and the third central axis I3 are coplanar. In addition, in the present disclosure, a centroid is calculated by the wall surrounding the space (please ignore the convex or concave portions) or by the wall of the tube body (please ignore the convex or concave portions), and the axis passing the centroid is defined as the central axis. In other embodiments, the shape of the cross-section of the inserted space can be varied according to the shape of the upper tube. The cross-section of the wire passage can be circular or can be shaped to other shapes, and the present disclosure is not limited thereto.

Figure 6:
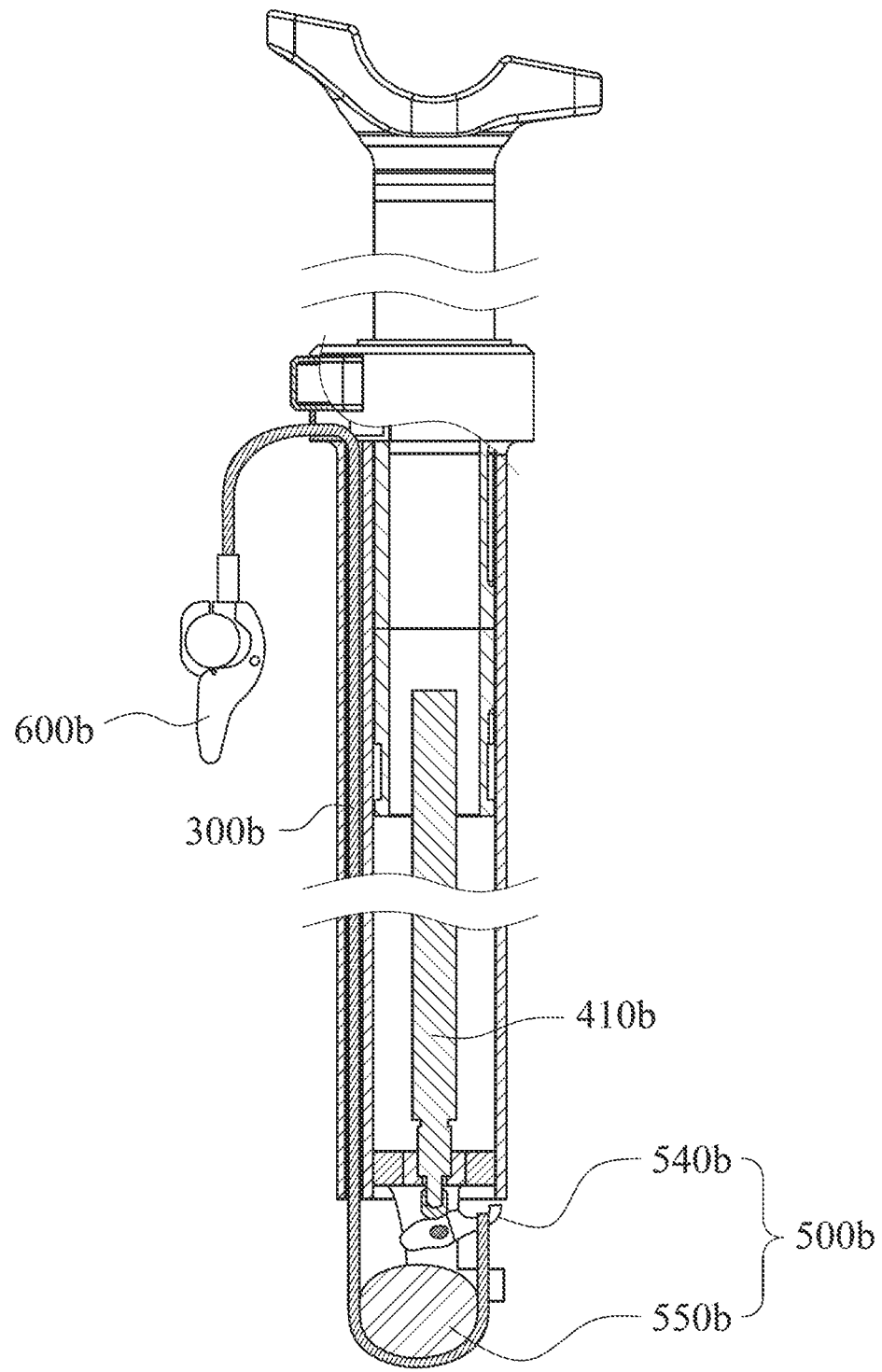
FIG. 6 shows a cross-sectional view of a bicycle seat post structure according to a third embodiment of the present disclosure.

FIG. 6 shows a cross-sectional view of a bicycle seat post structure 30 according to a third embodiment of the present disclosure. The bicycle seat post structure 30 is similar to the bicycle seat post structure 20 of the second embodiment, but the driving set 500b and the controlling set 600b are different. To be more specific, the driving set 500b can include a swinging lever 540b and a pulley 550b. The controlling set 600b has a trigger structure. The controlling set 600b is connected to the swinging lever 540b of the driving set 500b and is guided by the pulley 550b. When the controlling set 600b is pulled, the swinging lever 540b of the driving set 500b swings to push the actuating bar 410b. The wire 300b can be a steel rope in the embodiment. Moreover, for an electric height adjusting mechanism or a manual height adjusting mechanism, the wire 300b can be received in the wire passage.

Figure 7:
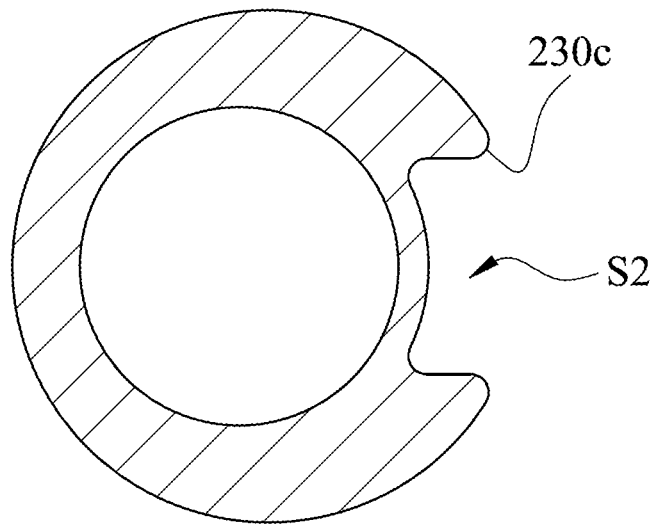
FIG. 7 shows a top cross-sectional view of a lower tube of a bicycle seat post structure according to the fourth embodiment of the present disclosure.

FIG. 7 shows a top cross-sectional view of a lower tube 200c of a bicycle seat post structure according to the fourth embodiment of the present disclosure. The lower tube 200c further includes a long opening 230c, the long opening 230c is disposed at an outer surface of the lower tube 200c along a direction of the first central axis (not shown in FIG. 7), and the long opening 230c is communicated with the wire passage S2 such that the wire passage S2 is exposed therefrom. In such configuration, even the wire passage S2 is exposed by the long opening 230c, the wire can still be received in the wire passage S2 while not protruding from the outer surface of the lower tube 200c.

Figure 8:
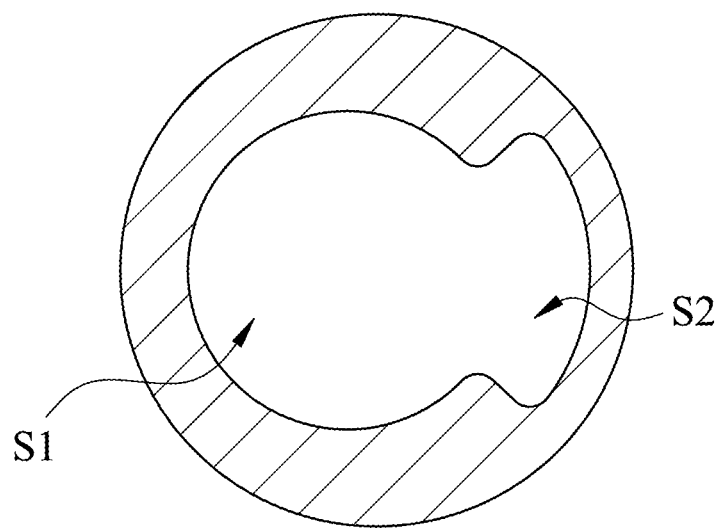
FIG. 8 shows a top cross-sectional view of a lower tube of a bicycle seat post structure according to the fifth embodiment of the present disclosure.

FIG. 8 shows a top cross-sectional view of a lower tube 200d of a bicycle seat post structure according to the fifth embodiment of the present disclosure. The wire passage S2 is radially communicated to the inserted space S1. In other words, no real boundary is disposed between the wire passage S2 and the inserted space S1. In such configuration, the circular portion forms the inserted space S1 to correspond to the upper tube (not shown), and the portion outside the circular portion can be defined as the wire passage S2 and can receive the wire.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A bicycle seat post structure, comprising:
   an upper tube; and
   a lower tube, comprising:
      an inserted space configured for the upper tube to be movably disposed therein; and
      a wire passage located at one side of the inserted space and configured to receive at least one wire;
   wherein the lower tube has a first central axis, the inserted space has a second central axis, and the first central axis and the second central axis are not co-axial.

2. The bicycle seat post structure of claim 1, further comprising:
   a height adjusting mechanism disposed inside the upper tube and the lower tube, the height adjusting mechanism comprising an actuating bar;
   a driving set configured to push the actuating bar; and
   a controlling set configured to control an operation of the driving set and comprising:
      a signal receiving terminal electrically connected to the driving set via the at least one wire.

3. The bicycle seat post structure of claim 1, further comprising:
   a height adjusting mechanism disposed inside the upper tube and the lower tube, the height adjusting mechanism comprising an actuating bar;
   a driving set configured to push the actuating bar; and
   a controlling set connected to the driving set via the at least one wire so as to control an operation of the driving set.

4. The bicycle seat post structure of claim 1, wherein the wire passage has a third central axis, and the first central axis, the second central axis and the third central axis are coplanar but not co-axial.

5. The bicycle seat post structure of claim 1, wherein the wire passage is radially communicated to the inserted space.

6. The bicycle seat post structure of claim 1, wherein the lower tube further comprises a long opening, the long opening is disposed at an outer surface of the lower tube along a direction of the first central axis, and the long opening is communicated with the wire passage such that the wire passage is exposed therefrom.

7. The bicycle seat post structure of claim 1, wherein the lower tube further comprises a partition, and the partition extends along a direction of the first central axis to separate the inserted space and the wire passage.

* * * * *